US012625665B2

(12) United States Patent
 Chen et al.

(10) Patent No.: US 12,625,665 B2
(45) Date of Patent: May 12, 2026

(54) MODULAR DISPLAY SCREEN CHASSIS INCLUDING A PLURALITY OF SHELLS HAVING A PLURALITY OF PRESET SIZES AND DISPLAY SCREEN

(71) Applicants: Shanghai Sansi Electronic Engineering Co. Ltd., Shanghai (CN); Shanghai Sansi Technology Co. Ltd., Shanghai (CN); Jiashan Sansi Optoelectronic Technology Co. Ltd., Jiaxing (CN); Pujiang Sansi Optoelectronic Technology Co. Ltd., Jinhua (CN); Zhejiang Puzhao Photoelectric Technology Co., Ltd., Jinhua (CN)

(72) Inventors: Chungen Chen, Shanghai (CN); Wenya Zhao, Shanghai (CN); Huafeng Wang, Shanghai (CN); Biao Wang, Shanghai (CN)

(73) Assignees: Shanghai Sansi Electronic Engineering Co. Ltd., Shanghai (CN); Shanghai Sansi Technology Co. Ltd., Shanghai (CN); Jiashan Sansi Optoelectronic Technology Co. Ltd., Jiaxing (CN); Pujiang Sansi Optoelectronic Technology Co. Ltd., Jinhua (CN); Zhejiang Puzhao Photoelectric Technology Co., Ltd., Jinhua (CN)

( * ) Notice: Subject to any disclaimer, the term of this patent is extended or adjusted under 35 U.S.C. 154(b) by 0 days.

(21) Appl. No.: 18/893,921

(22) Filed: Sep. 23, 2024

(65) Prior Publication Data

US 2025/0181300 A1     Jun. 5, 2025

(30) Foreign Application Priority Data

Dec. 5, 2023     (CN) ......................... 202323309615.6

(51) Int. Cl.
 *G06F 3/14* (2006.01)
 *G06F 1/16* (2006.01)

(52) U.S. Cl.
 CPC .......... *G06F 3/1446* (2013.01); *G06F 1/1601* (2013.01)

(58) Field of Classification Search
 None
 See application file for complete search history.

(56) References Cited

U.S. PATENT DOCUMENTS

| | | | |
|---|---|---|---|
| 9,053,648 B1 * | 6/2015 | Lee | G02B 3/0037 |
| 2014/0132481 A1 * | 5/2014 | Bell | G06F 1/1626 |
| | | | 361/679.01 |
| 2016/0034240 A1 * | 2/2016 | Kreiner | G09F 9/3026 |
| | | | 348/383 |
| 2020/0035134 A1 * | 1/2020 | Pahlevaninezhad | |
| | | | H01R 13/6205 |
| 2020/0194539 A1 * | 6/2020 | Kim | G06F 3/1446 |
| 2020/0225903 A1 * | 7/2020 | Cohen | G09G 5/12 |

\* cited by examiner

*Primary Examiner* — Kirk W Hermann
(74) *Attorney, Agent, or Firm* — IPRTOP LLC

(57) ABSTRACT

A modular display screen chassis, including shells and one or more display modules. The shells have various preset sizes, and each shell is provided with a chamfer on its sides for splicing with a chamfer of an adjacent shell at a specific angle. The display modules 2 can be detachably attached on the shell 1, and each one has a fixed size. Each of the shells having various preset sizes corresponds to different numbers of the display modules.

10 Claims, 10 Drawing Sheets

1

11

1

1

1 11

1

1

1

11

1

1

1

MODULAR DISPLAY SCREEN CHASSIS INCLUDING A PLURALITY OF SHELLS HAVING A PLURALITY OF PRESET SIZES AND DISPLAY SCREEN

TECHNICAL FIELD

The present disclosure relates to the technical field of large-screen display and in particular to a modular display screen chassis as well as a display screen.

BACKGROUND TECHNOLOGY

With the increasing demand for information display, commercial large screens are getting closer to people's daily life, such as displaying advertisement in shopping malls, displaying train and flight information at stations and airports. Meanwhile, with the continuous development of society, people have more and more requirements for the functions of the commercial large screens, such as the requirements for smaller screen spacing, lighter chassis, and easier installation.

Indoor display screens, as an important branch of large-screen displays, have developed rapidly in response to the market demand for indoor small-pitch display products, such as cinema screens and storefront screens. Currently, the size and installation method of traditional indoor display screen chassis are rather limited. Customers need a display screen chassis that is compatible with multiple sizes of display screens and can be spliced to form various shapes.

SUMMARY OF THE INVENTION

A modular display screen chassis includes multiple shells and one or more display modules detachably mounted on the shells.

The shells have various preset sizes and each one is provided with a chamfer on its sides for splicing with a chamfer of an adjacent shell at a specific angle.

Each of the one or more display modules has a fixed size. Each of the preset sizes is integer multiples of the fixed size. Each of the shells having the plurality of preset sizes corresponds to different numbers of the display modules As a more preferred way, the display modules and the multiple shells are connected by magnetic attraction, and magnetic components are set at corresponding positions of the multiple shells and the display modules.

As a more preferred way, the display modules and the multiple shells are connected by a claw structure. The claw structure includes a clamp set on the multiple shells and a corresponding fixed post set on the display modules for connecting with the clamp.

As a more preferred way, the clamp includes a base plate, multiple elastic pieces and multiple clamping pieces which are integrally formed with the base plate. A gap between the multiple elastic pieces is configured to accommodate the fixed post, and the multiple elastic pieces are configured to clamp the fixed post. The multiple clamping pieces are configured to fix the clamp with a connecting hole. The multiple elastic pieces configured to clamp the fixed post are used for assembly and disassembly of a panel structure. A center of the base plate is provided with a locating hole.

As a more preferred way, the fixed post includes a locating part, a protruding part, and a connecting part, which are integrally molded. The fixed post is connected to the support base through the connecting part. The locating part includes a locating slot adapted to the locating hole. When the fixed post is clamped within the structure of the clamp, the locating part is inserted into the locating hole and a wall of the locating hole restricts a movement of the locating part within the locating slot. The protruding part is in tight contact with the base plate while the multiple elastic pieces restrict a location of the protruding part.

As a more preferred way, an angle of the chamfer of the multiple shells is 45°, so that when two shells are fitted together along edges of their chamfers, two adjacent display modules corresponding to the two shells are perpendicular to each other.

As a more preferred way, the shells have four sizes, which are respectively 1000 mm×250 mm, 750 mm×250 mm, 500 mm×250 mm and 250 mm×250 mm. The above four sizes of the shells can meet various usage scenarios.

As a more preferred way, each of the display modules has a fixed size of 250 mm×250 mm.

As a more preferred way, each of the display modules includes a support frame, a circuit board set on the support frame, and a light-emitting unit set on the circuit board. The support frame is detachably connected to the shells, and is used to protect the internal circuit structure of the display modules.

In order to solve the above problems, the present disclosure also provides a display screen, including multiple above modular display screen chassis, and the display screen is assembled by splicing adjacent modular display screen chassis two by two.

As mentioned above, the modular display screen chassis and display screen of the present disclosure have the following beneficial effects: when the modular display screen chassis of this present disclosure is in use, firstly, the shells of various sizes allow users to choose the appropriate size according to the installation space, improving the applicability of the product and enriching the usage scenarios. Secondly, the sides of the shell are provided with chamfers for assembling with each other at a specific angle, which allows adjacent shells to be assembled at a certain included angle or even form a certain curvature. Furthermore, in this embodiment, the display module adopts a fixed size, which makes the production of the display module easier to standardize and scale, thereby reducing production costs. At the same time, display modules are detachably set on the shells, further improving the convenience of maintaining the modular display screen chassis. The chassis can be easily maintained from the front side of the modular display screen chassis, by simply using tools to open the display module, without the need to open the complex chassis structure from the rear side. The display screen of the present disclosure is assembled by a number of the modular display screen chassis. Firstly, the chamfers on the modular display screen chassis allow the display screen to display images in more forms, such as vertical forms, curved forms and even ball forms. Meanwhile, the sizes of the modular display screen chassis are diverse, making it more suitable for the assembly of irregular screens.

In summary, the modular display screen chassis and display screen of the present disclosure, through various preset sizes and chamfered shells, meet the users' requirements in more scenarios while facilitating production and maintenance, thus addressing the issue of indoor displays in existing technology being unable to satisfy customer demands for compatibility with multiple sizes and the ability to be spliced into various forms.

DETAILED DESCRIPTION

Figure 1:
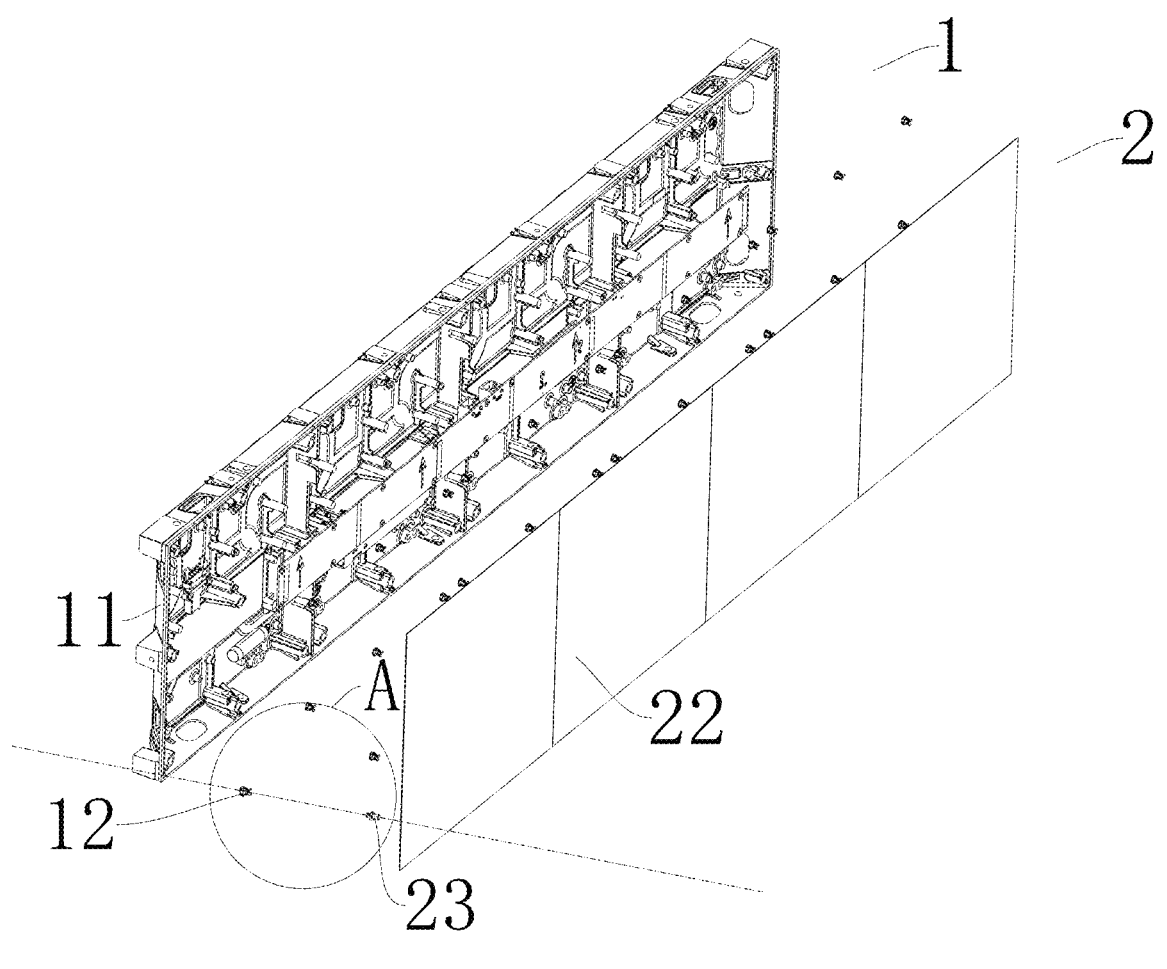
FIG. 1 illustrates a schematic diagram of a modular display screen chassis and a display screen of the present disclosure.
Figure 2:
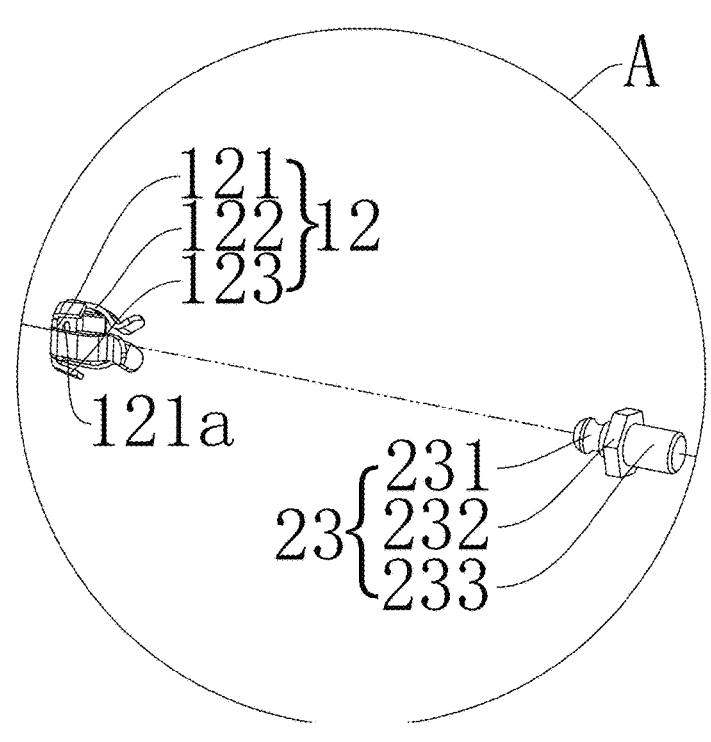
FIG. 2 illustrates a partial enlarged view of region A in FIG. 1.
Figure 3:
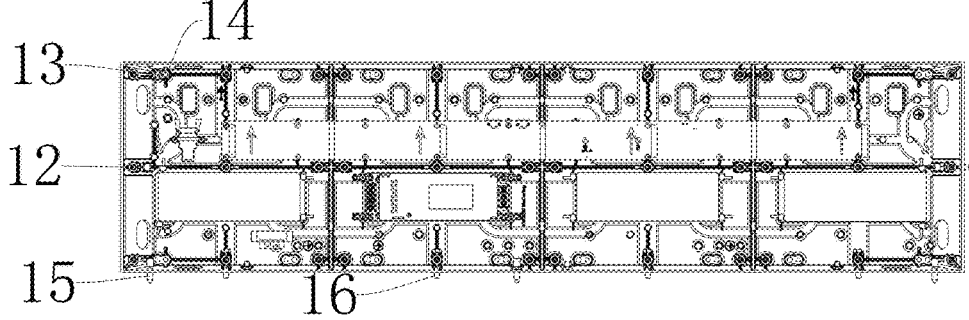
FIG. 3 illustrates a schematic diagram of shells of a modular display screen chassis.
Figure 4:
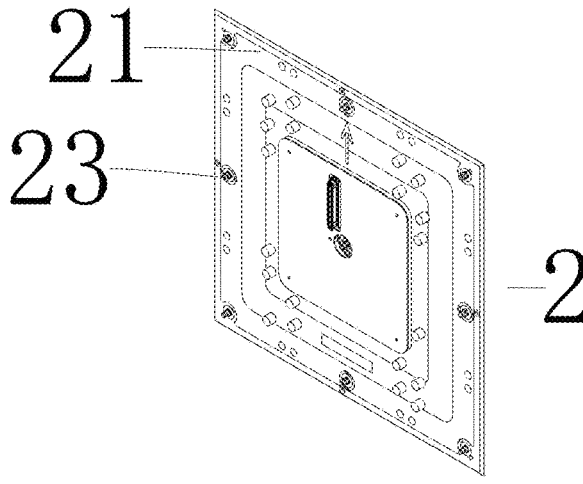
FIG. 4 illustrates a schematic diagram of a display module of a modular display screen chassis.

The specific embodiments are described below to illustrate the implementation of the present disclosure, and those skilled in the art can easily understand other advantages and effects of the present disclosure from the content disclosed in this specification.

It should be noted that the structures, proportions, sizes, etc. shown in the accompanying drawings are only intended to complement the content disclosed in the specification for the understanding and reading by those familiar with the technology, and they are not conditions to limit the implementation of the present disclosure. Any modification of the structure, change in proportion, or adjustment of size, as long as they do not compromise the effectiveness and purpose of this invention, should still be considered within the scope of the technical contents disclosed in the present disclosure. The following detailed description should not be considered limiting, and the scope of the embodiments of the present application is only limited by the patent claims published. The terms used herein are only intended to describe specific implementations, rather than to limit the scope of this application. Terms related to space, such as "up", "down", "left", "right", "below", "under", "lower", "above", and "upper", can be used in the text to illustrate the relationship between one component or feature shown and another component or feature in the drawings.

In the present disclosure, unless otherwise specified and limited, terms such as "installation", "connection", "linkage", "fixation", "retention" and the like should be broadly understood, for example, it can be a fixed connection, a detachable connection, or an integral connection; it can be a mechanical connection, or an electrical connection; it can be a direct connection, or an indirect connection through an intermediate medium, and it also can be communication inside two components. For those skilled in the art, the specific meanings of the above terms in the present disclosure can be understood according to the specific situation.

Furthermore, in this article, the singular forms "a," "an," and "the" include plural referents, unless otherwise indicated by the context. It should be further understood that the terms "including" and "comprising" indicate the presence of the described features, operations, elements, components, items, types, and/or groups, but do not exclude the presence, occurrence, or addition of one or more other features, operations, elements, components, items, types, and/or groups. The terms "or" and "and/or" used here are interpreted as inclusive, meaning any one or any combination. Therefore, "A, B, or C" or "A, B and/or C" means "any one or more of the following: A; B; C; A and B; A and C; B and C; A, B and C". Only when the combination of elements, functions, or operations inherently repel each other in some way, will the exceptions to this definition be allowed.

Figures 5, 6:
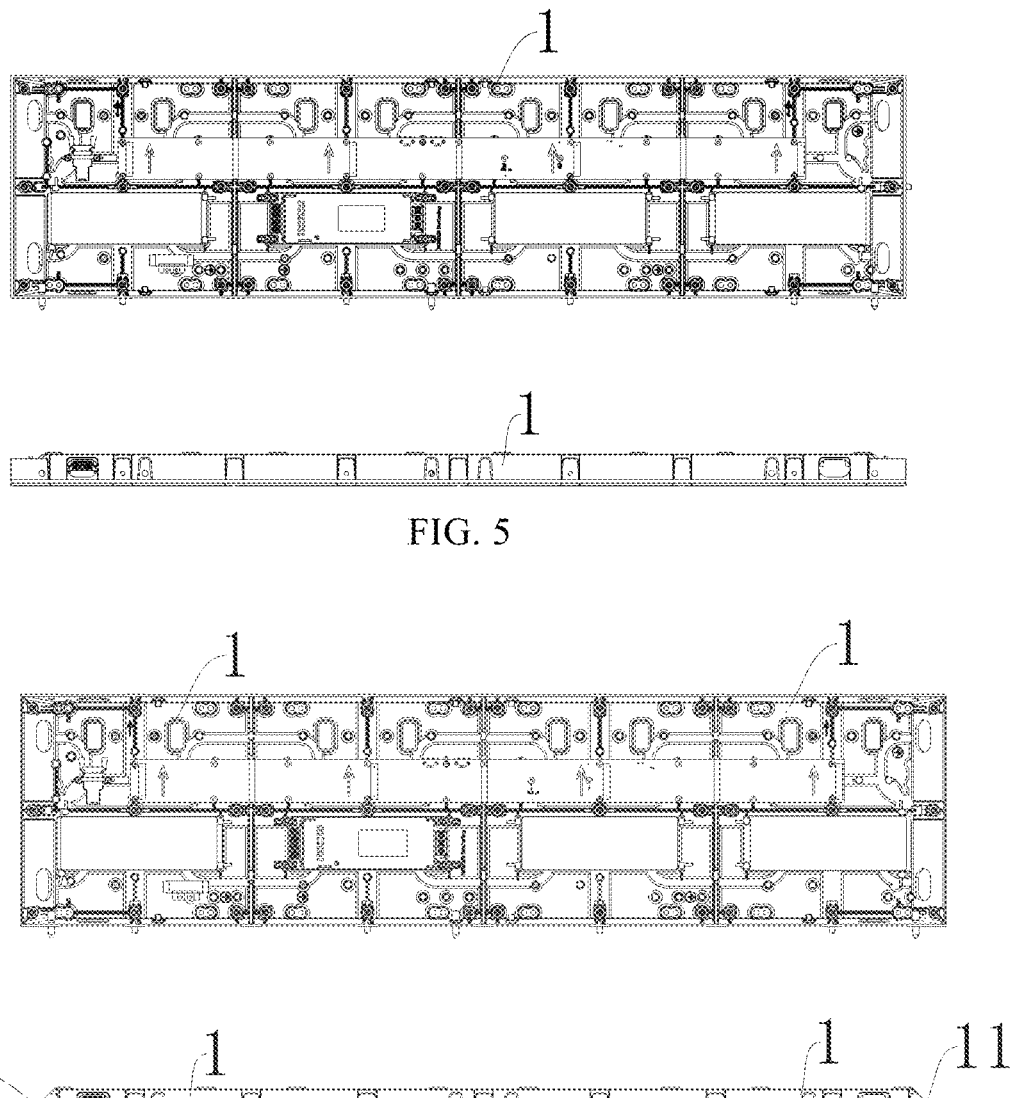
FIG. 5 illustrates a schematic diagram of a shell with no chamfer and having a size of 1000 mm×250 mm of a modular display screen chassis.
FIG. 6 illustrates a schematic diagram of a shell with double-sided chamfers and having a size of 1000 mm×250 mm of a modular display screen chassis.

As shown in FIG. 1, the present disclosure provides a modular display screen chassis, including multiple shells 1 and one or more display modules 2 detachably mounted on the shells 1. The shells 1 have various preset sizes and each shell has one or more chamfers 11 on its sides for splicing with a chamfer of an adjacent shell at a specific angle, as shown in FIGS. 1 and 6. Each of the display modules 2 has a fixed size. Each of the preset sizes of the shells 1 is integer multiples of the fixed size of the display modules 2. Each of the shells 1 having various preset sizes corresponds to different numbers of display modules 2.

When the modular display screen chassis of this present disclosure is in use, firstly, the shells 1 of various sizes allow users to choose the appropriate size according to the installation space, improving the applicability of the product and enriching the usage scenarios. Secondly, the sides of each shell 1 are provided with chamfers 11 for assembling with an adjacent shell 1 at a specific angle, which allows two adjacent shells 1 to be assembled with a certain included angle or even form a certain curvature. Furthermore, in this embodiment, the display modules 2 adopt a fixed size, which makes the production of the display modules 2 easier to standardize and scale, thereby reducing production costs. At the same time, the display modules 2 are detachably set on the shells 1, further improving the convenience of maintaining the modular display screen chassis. The chassis can be easily maintained from the front side of the modular display screen chassis, by simply using tools to open the display modules, without the need to open the complex chassis structure from the rear side.

As a more preferred way, the display modules 2 and the shells 1 are connected by magnetic attraction, and magnetic components are set at corresponding positions on the shells 1 and the display modules 2. When the modular display screen chassis needs to be maintained, it only needs to use a magnetic tool to suck tight and lift the display modules 2 and open the display modules 2 on the front side of the modular display screen chassis, so that the chassis can be conveniently maintained from the front side of the modular display screen chassis without opening the complex chassis structure from the rear, which further improves the convenience of maintenance for the modular display screen chassis.

As a more preferred way, the display modules 2 and the shells 1 are connected by a claw structure. The claw structure includes a clamp 12 set on the shells 1 and a corresponding fixed post 23 set on the display modules 2 for connecting with the clamp. When the modular display screen chassis needs to be maintained, it only needs to use a magnetic tool to suck tight and lift the display modules 2 and open the display modules 2 on the front side of the modular display screen chassis, so that the chassis can be conveniently maintained from the front side of the modular display screen chassis without opening the complex chassis structure from the rear, which further improves the convenience of maintenance for the modular display screen chassis.

As a more preferred way, the clamp 12 includes a base plate 121, and multiple elastic pieces 122 and multiple clamping pieces 123 which are integrally formed with the base plate 121. The gap between the multiple elastic pieces 122 are used to accommodate the fixed post 23, while the elastic pieces 122 can clamp the fixed post 23. The clamping pieces 123 are used to fix the clamp 12 with a connecting hole. The use of the elastic pieces 122 to clamp the fixed post 23 makes the assembly and disassembly of the panel structure more convenient, and the center of the base plate 121 is provided with a locating hole 121*a*.

As a more preferred way, the fixed post 23 includes a locating part 231, a protruding part 232, and a connecting part 233, which are integrally molded. The fixed post 23 is connected to the support base through the connecting part 233. The locating part 231 includes a locating slot adapted to the locating hole 121*a*. When the fixed post 23 is clamped within the structure of the clamp 12, the locating part 231 is inserted into the locating hole 121*a* and the wall of the locating hole 121*a* restricts the movement of the locating part 231 within the slot. The protruding part 232 is in tight contact with the base plate 121 while the elastic pieces 122 restrict the location of the protruding part 232.

Furthermore, in this embodiment, the display modules 2 and the shells 1 can be simultaneously connected by magnetic attraction and claw structure. Firstly, the magnetic attraction is convenient for quick positioning due to its automatic positioning characteristics. However, the insufficient locking ability of magnetic attraction brings a risk of detachment. Therefore, the claw structure is used to fasten the display modules 2, making them more securely fixed with the magnetic attraction module. In this embodiment, the display modules 2 and the shells 1 simultaneously adopt magnetic attraction and claw structure for connection. Initially. Magnetic attraction is used for positioning, and then the claw structure is used for tightening, which combines the advantages of quick positioning and firm connection.

As a more preferred way, the angle of the chamfer 11 is 45°, so that when two shells 1 are fitted together along the edges of their chamfers 11, two adjacent display modules 2 corresponding to the two shells 1 are perpendicular to each other.

Figure 7:
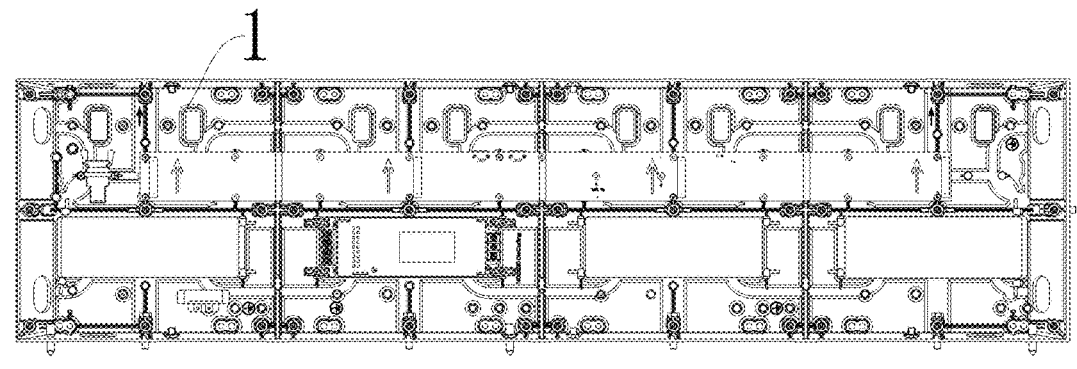
FIG. 7 illustrates a schematic diagram of a shell with a left side chamfer and having a size of 1000 mm×250 mm of a modular display screen chassis.
Figure 7:
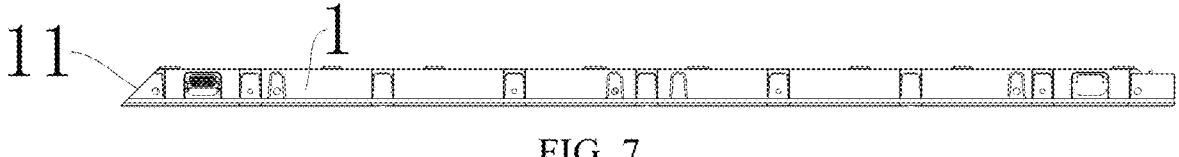
Figure 8:
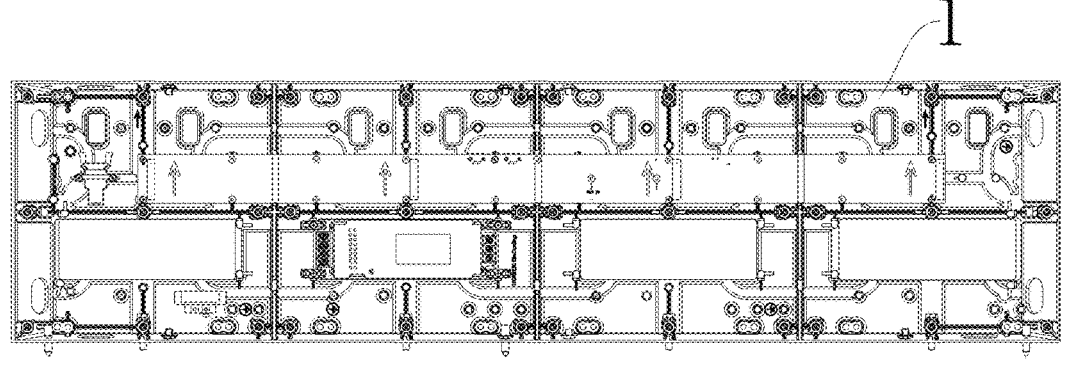
FIG. 8 illustrates a schematic diagram of a shell with a right side chamfer and having a size of 1000 mm×250 mm of a modular display screen chassis.
Figure 8:
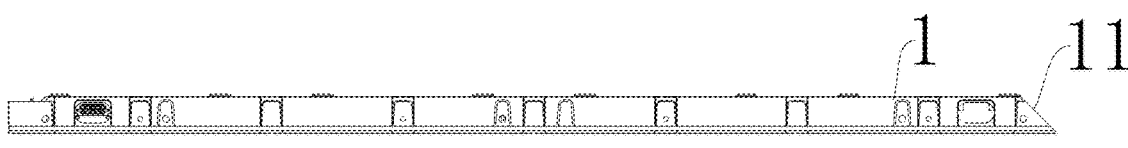
Figure 9:
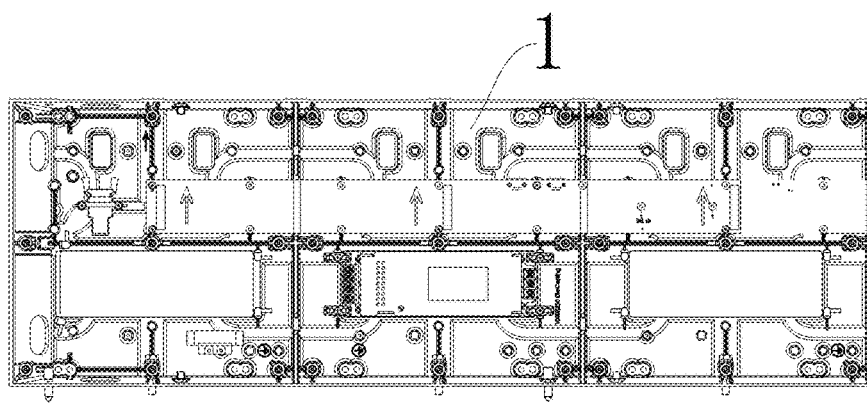
FIG. 9 illustrates a schematic diagram of a shell with no chamfer and having a size of 750 mm×250 mm of a modular display screen chassis.
Figure 9:
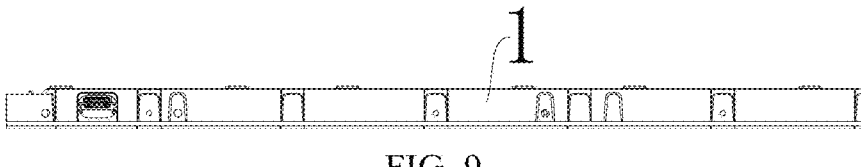
Figure 10:
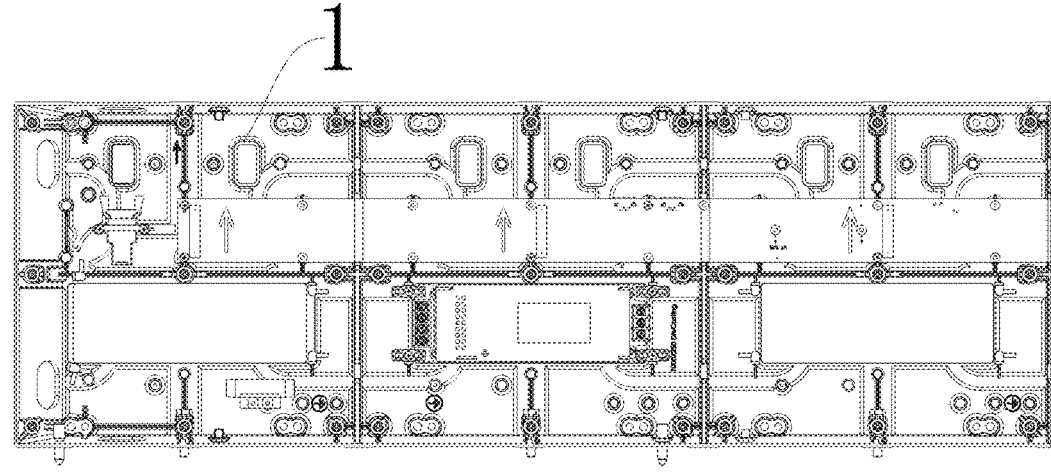
FIG. 10 illustrates a schematic diagram of a shell with a left side chamfer and having a size of 750 mm×250 mm of a modular display screen chassis.
Figure 10:
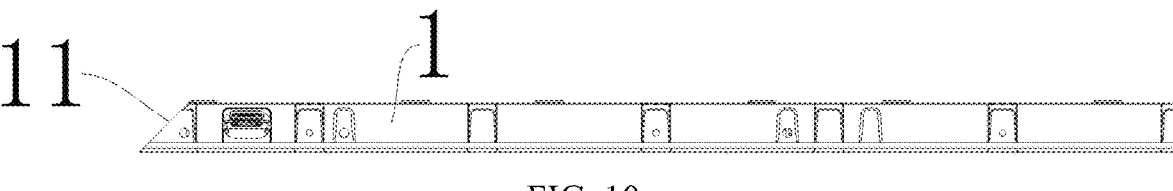
Figure 11:
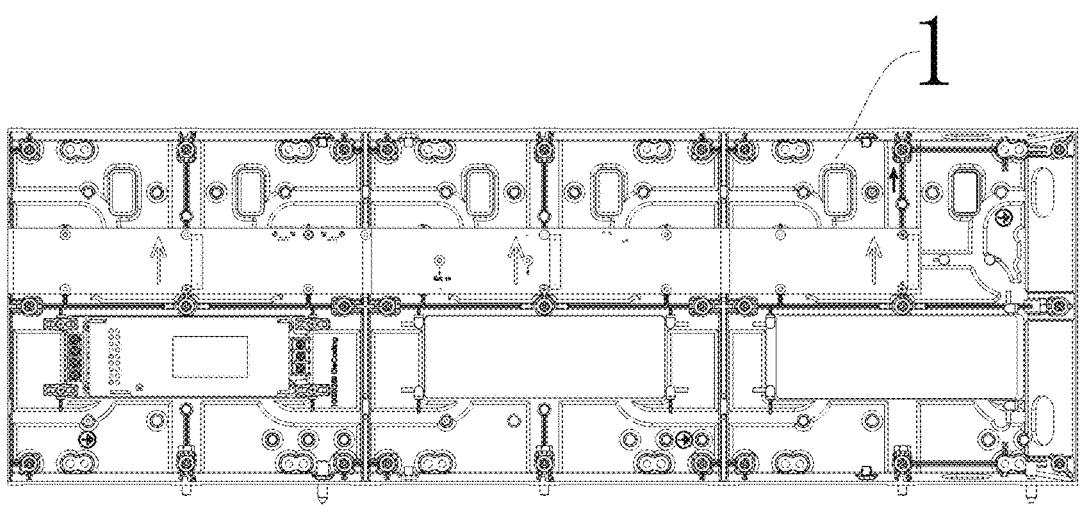
FIG. 11 illustrates a schematic diagram of a shell with a right side chamfer and having a size of 750 mm×250 mm of a modular display screen chassis.
Figure 11:
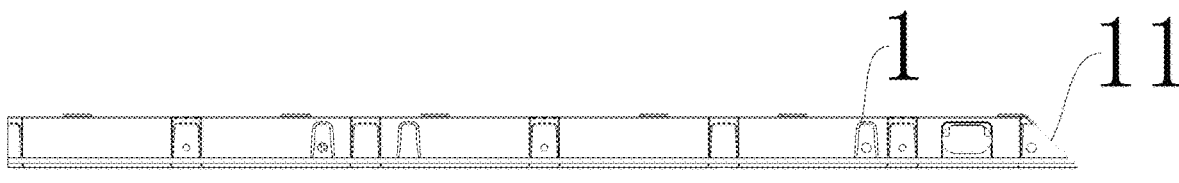
Figure 12:
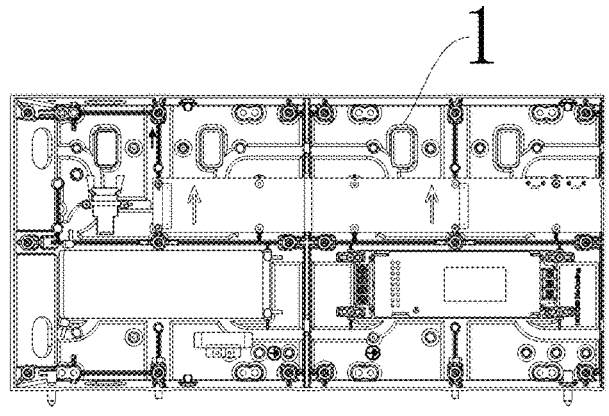
FIG. 12 illustrates a schematic diagram of a shell with no chamfer and having a size of 500 mm×250 mm of a modular display screen chassis.
Figure 12:
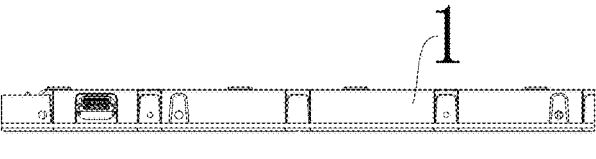
Figure 13:
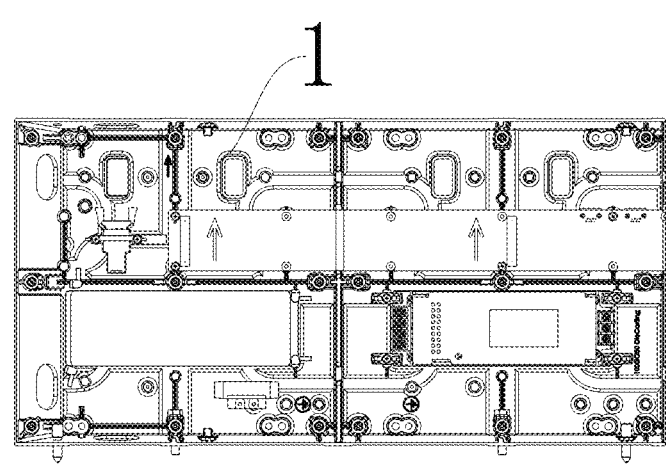
FIG. 13 illustrates a schematic diagram of a shell with a left side chamfer and having a size of 500 mm×250 mm of a modular display screen chassis.
Figure 13:
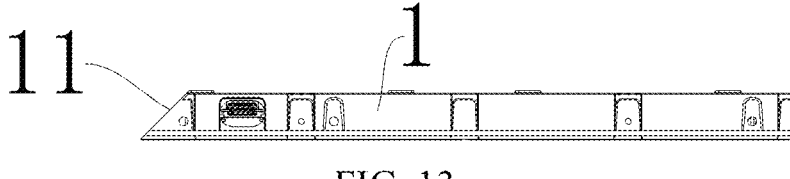
Figure 14:
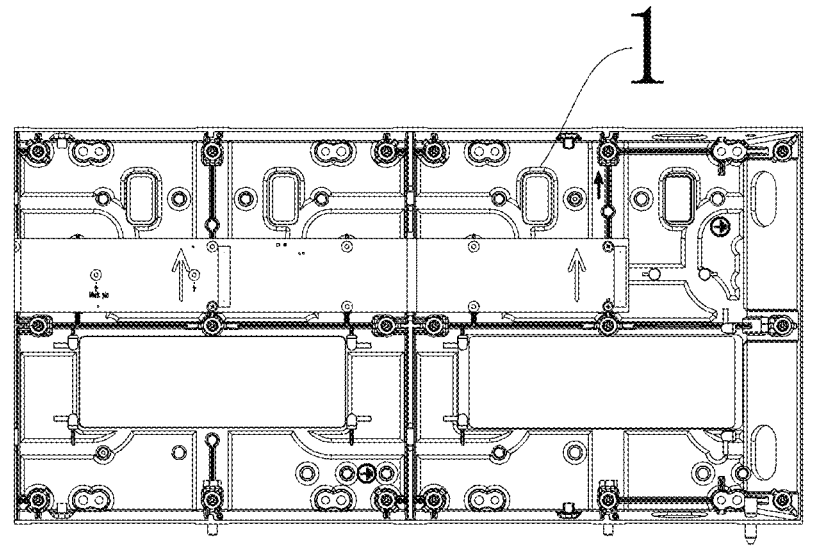
FIG. 14 illustrates a schematic diagram of a shell with a right side chamfer and having a size of 500 mm×250 mm of a modular display screen chassis.
Figure 14:
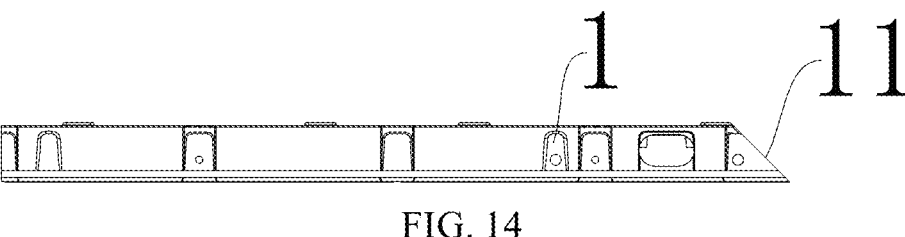
Figure 15:
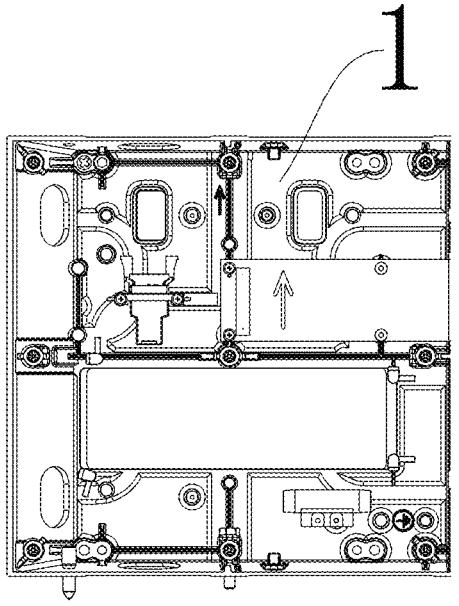
FIG. 15 illustrates a schematic diagram of a shell with no chamfer and having a size of 250 mm×250 mm of a modular display screen chassis.
Figure 15:
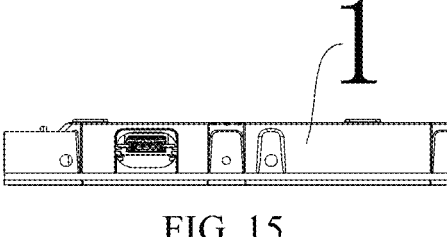
Figure 16:
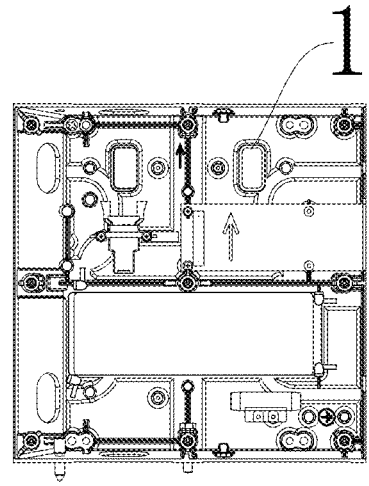
FIG. 16 illustrates a schematic diagram of a shell with a left side chamfer and having a size of 250 mm×250 mm of a modular display screen chassis.
Figure 16:
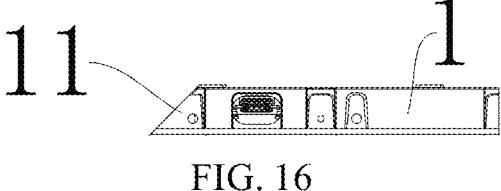
Figure 17:
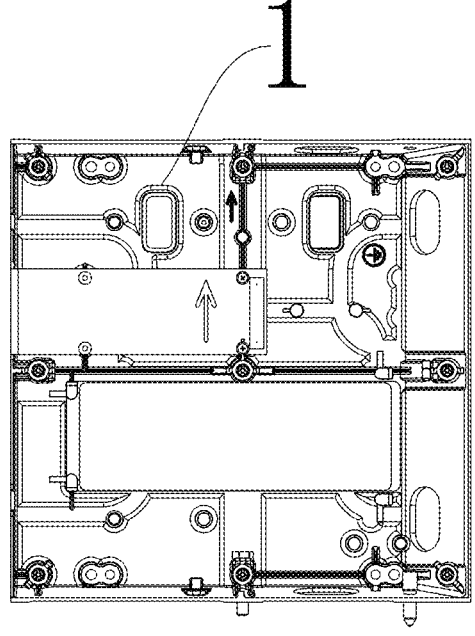
FIG. 17 illustrates a schematic diagram of a shell with a right side chamfer and having a size of 250 mm×250 mm of a modular display screen chassis.
Figure 17:
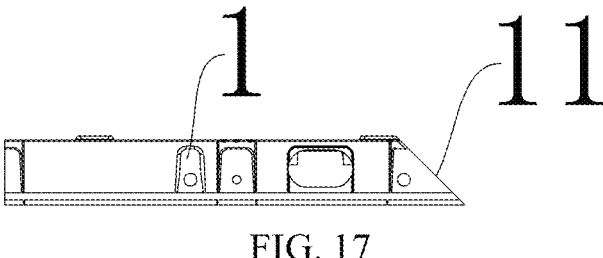

As a more preferred way, the shells 1 have four sizes, which are respectively 1000 mm×250 mm, 750 mm×250 mm, 500 mm×250 mm, and 250 mm×250 mm. The above four sizes of the shells 1 can adapt to a variety of usage scenarios. In this embodiment, the four sizes corresponds to multiple chamfer 11 structures, which are respectively a structure with no chamfer 11, having a size of 1000 mm×250 mm, as shown in FIG. 5; a structure with double-sided chamfers 11, having a size of 1000 mm×250 mm, as shown in FIG. 6; a structure with a left side chamfer 11, having a size of 1000 mm×250 mm, as shown in FIG. 7; and a structure with a right side chamfer 11, having a size of 1000 mm×250 mm, as shown in FIG. 8; a structure with no chamfer 11, having a size of 750 mm×250 mm, as shown in FIG. 9; a structure with a left side chamfer 11, having a size of 750 mm×250 mm, as shown in FIG. 10; a structure with a right side chamfer 11, having a size of 750 mm×250 mm, as shown in FIG. 11; a structure with no chamfer 11, having a size of 500 mm×250 mm, as shown in FIG. 12; a structure with a left side chamfer 11, having a size of 500 mm×250 mm, as shown in FIG. 13; a structure with a right side chamfer 11, having a size of 500 mm×250 mm, as shown in FIG. 14; a structure with no chamfer 11, having a size of 250 mm×250 mm, as shown in FIG. 15; a structure with a left side chamfer 11, having a size of 250 mm×250 mm, as shown in FIG. 16; a structure with a right side chamfer 11, having a size of 250 mm×250 mm, as shown in FIG. 17, so that the shells of one or more sizes can be assembled according to the customer's needs, while ensuring that no chamfers are present on either side of the shells 1 after assembly. Specifically, for assembling a straight screen with sizes of 1500 mm×250 mm, two options are available. The first option is to combine a no-chamfer 11 structure with a size of 1000 mm×250 mm with another no-chamfer 11 structure with a size of 500 mm×250 mm. The second option is to use two no-chamfer 11 structures, each with a size of 750 mm×250 mm.

As a more preferred way, the size of each display modules 2 is 250 mm×250 mm.

As a more preferred way, each display modules 2 includes a support frame 21, a circuit board set on the support frame 21, and a light-emitting unit 22 set on the circuit board. The support frame 21 is detachably connected to the shells 1, and is used to protect the internal circuit structures of the display modules 2. What's more, in this embodiment, the circuit board adopts PCB board, which is sturdy, durable, easy to install, and reliable in operation. The light-emitting unit 22 includes multiple LED beads uniformly arranged on the circuit board, offering the following advantages: Firstly, the LED light beads are small in size and low in power consumption, which makes the LEDs more efficient in power usage and suitable for long-term continuous operation. Secondly, the LED light beads have a long service life, which can typically exceed 10 years, greatly reducing the frequency of replacements and maintenance costs. Thirdly, the LED light beads exhibit high brightness and low heat generation. LEDs with a high luminous efficiency and low heat generation contribute to improving the lighting effect and reducing the risk of equipment overheating. Additionally, the LED light beads are environmentally friendly because they do not contain mercury or other toxic substances, posing no threat to the environment. Finally, LED light beads are sturdy and suitable for various environmental conditions due to their high resistance to vibration and impact. They also have a short response time, allowing them to quickly reach maximum brightness.

Furthermore, in this embodiment, the shells 1 are made of aluminum alloy through the die-casting process. Aluminum alloy has low density, light weight, and high strength. It is approximately ⅓ lighter than ordinary steel, ⅔ lighter than brass, and half lighter than stainless steel. Additionally, aluminum alloy has good machinability, which can be easily formed into various shapes, and is suitable for various processing techniques such as milling, drilling, cutting, stretching, and deep drawing. It also exhibits corrosion resistance and can be used for a long time in the atmosphere, as it is not prone to rusting. Finally, aluminum alloy is recyclable, which is beneficial for environmental protection and resource conservation.

Furthermore, in this embodiment, the shells 1 are also provided with fixing screws 13 and adjusting screws 14. The adjusting screws 14 are used to facilitate the leveling of the display modules 2. Additionally, in this embodiment, locating pins 15, locating holes, and external hex screws 16 are also provided at corresponding positions on the shells 1. The locating pins 15 and locating holes are used to assist in positioning between adjacent shells 1, while the external hex screws 16 are used for locking and fastening.

The present disclosure also provides a display screen including multiple above-mentioned modular display screen chassis. The display screen is assembled by splicing adjacent modular display screen chassis two by two.

The display screen of the present disclosure is assembled by a plurality of the above-mentioned modular display screen chassis. Firstly, the chamfer 11 on the shells 1 of the modular display screen chassis meets the requirement for the display screen to show images in various forms, such as vertical, curved, or even spherical forms. At the same time, the sizes of the modular display screen chassis are diverse, making it more suitable for the assembly of irregular screens.

In summary, the modular display screen chassis and display screen of the present disclosure, through various preset sizes and chamfered shells, meet the users' requirements in more scenarios while facilitating production and maintenance, thus addressing the issue of indoor displays in existing technology being unable to satisfy customer demands for compatibility with multiple sizes and the ability to be spliced into various forms. As a result, the present disclosure effectively addresses the limitations of existing technologies, making it highly valuable for industrial applications.

The embodiments described above serve merely as illustrative examples of the principles and effects of the present disclosure, and are not intended to serve as limitations on the invention. Persons skilled in the art may modify or alter these embodiments without departing from the spirit and scope of the present disclosure. Therefore, any equivalent modifications or alterations made by those skilled in the art, which are consistent with the spirit and technical concepts disclosed in the present disclosure, shall still fall within the scope of the claims of the present disclosure.

The invention claimed is:

1. A modular display screen chassis, comprising:
a plurality of shells (1), having a plurality of preset sizes, wherein each of the plurality of shells (1) is provided with a chamfer (11) on its sides for splicing with a chamfer of an adjacent shell at a specific angle; and
one or more display modules (2), each having a fixed size and detachably mounted on the plurality of shells (1), wherein each of the plurality of preset sizes is integer multiples of the fixed size, wherein each of the plurality of shells (1) having the plurality of preset sizes corresponds to different numbers of the display modules (2).

2. The modular display screen chassis according to claim 1, wherein the display modules (2) and the plurality of shells (1) are connected by magnetic attraction, and magnetic components are set at corresponding positions of the plurality of shells (1) and the display modules (2).

3. The modular display screen chassis according to claim 1, wherein the display modules (2) and the plurality of shells (1) are connected by a claw structure, wherein the claw structure includes a clamp (12) set on the plurality of shells (1) and a corresponding fixed post (23) set on the display modules (2) for connecting with the clamp (12).

4. The modular display screen chassis according to claim 3, wherein the clamp (12) includes a base plate (121), and a plurality of elastic pieces (122) and a plurality of clamping pieces (123) which are integrally formed with the base plate (121),
wherein a gap between the plurality of elastic pieces (122) is configured to accommodate the fixed post (23), and the plurality of elastic pieces (122) is configured to clamp the fixed post (23),
wherein the plurality of clamping pieces (123) is configured to fix the clamp (12) with a connecting hole,
wherein the plurality of elastic pieces (122) configured to clamp the fixed post (23) is used for assembly and disassembly of a panel structure,
wherein a center of the base plate (121) is provided with a locating hole (121*a*).

5. The modular display screen chassis according to claim 4, wherein the fixed post (23) includes a locating part (231), a protruding part (232), and a connecting part (233), which are integrally molded,
wherein the fixed post (23) is connected to a support base through the connecting part (233);
wherein the locating part (231) includes a locating slot adapted to the locating hole (121*a*);
wherein when the fixed post (23) is clamped within the structure of the clamp (12), the locating part (231) is inserted into the locating hole (121*a*) and a wall of the locating hole (121*a*) restricts a movement of the locating part (231) within the locating slot;
wherein the protruding part (232) is in tight contact with the base plate (121) while the plurality of elastic pieces (122) restricts a location of the protruding part (232).

6. The modular display screen chassis according to claim 1, wherein an angle of the chamfer (11) of the plurality of shells (1) is 45°, so that when two shells (1) are fitted together along edges of their chamfers (11), two adjacent display modules (2) corresponding to the two shells (1) are perpendicular to each other.

7. The modular display screen chassis according to claim 1, wherein the shells (1) have four sizes, which are respectively 1000 mm×250 mm, 750 mm×250 mm, 500 mm×250 mm, and 250 mm×250 mm.

8. The modular display screen chassis according to claim 7, wherein each of the display modules (2) has a fixed size of 250 mm×250 mm.

9. The modular display screen chassis according to claim 1, wherein each of the display modules (2) includes a support frame (21), a circuit board set on the support frame (21), and a light-emitting unit (22) set on the circuit board; wherein the support frame (21) is detachably connected to the shells (1).

10. A display screen, comprising a plurality of modular display screen chassis as claimed in claim 1, wherein the display screen is assembled by splicing adjacent modular display screen chassis two by two.

* * * * *